(12) United States Patent
Tanaka et al.

(10) Patent No.: US 9,539,894 B2
(45) Date of Patent: Jan. 10, 2017

(54) AUTOMOTIVE FUEL TANK

(71) Applicant: HONDA MOTOR CO., LTD., Tokyo (JP)

(72) Inventors: Kotaro Tanaka, Wako (JP); Shoichiro Kumagai, Wako (JP); Hiroshi Kitamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/734,241

(22) Filed: Jun. 9, 2015

(65) Prior Publication Data
US 2015/0360560 A1 Dec. 17, 2015

(30) Foreign Application Priority Data
Jun. 17, 2014 (JP) .................. 2014-124094

(51) Int. Cl.
| | | |
|---|---|---|
| *B60K 15/03* | (2006.01) | |
| *B32B 1/02* | (2006.01) | |
| *B32B 7/12* | (2006.01) | |
| *B32B 27/06* | (2006.01) | |
| *B32B 27/08* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |

(52) U.S. Cl.
CPC .......... *B60K 15/03177* (2013.01); *B32B 1/02* (2013.01); *B32B 7/12* (2013.01); *B32B 27/065* (2013.01); *B32B 27/08* (2013.01); *B32B 27/306* (2013.01); *B32B 27/32* (2013.01); *B32B 27/34* (2013.01); *B32B 27/36* (2013.01); *B32B 2266/025* (2013.01); *B32B 2272/00* (2013.01); *B32B 2307/7265* (2013.01); *B32B 2439/00* (2013.01); *B32B 2605/08* (2013.01); *B60K 2015/03046* (2013.01); *B60K 2015/03493* (2013.01)

(58) Field of Classification Search
CPC ............... B60K 15/03177; B60K 2015/03493; B60K 2015/03046; B32B 1/02; B32B 2439/00; B32B 2605/08
USPC .................................. 220/564, 562
See application file for complete search history.

(56) References Cited

U.S. PATENT DOCUMENTS

| | | | |
|---|---|---|---|
| 6,543,426 B1 * | 4/2003 | Schwochert ..... | B60K 15/03177 123/516 |
| 6,719,163 B1 * | 4/2004 | Delbarre .......... | B60K 15/03177 220/4.14 |
| 8,066,146 B2 * | 11/2011 | Tsukahara ........... | F28D 20/0034 156/213 |

(Continued)

FOREIGN PATENT DOCUMENTS

JP 5333116 B2 11/2013

*Primary Examiner* — Stephen Castellano
(74) *Attorney, Agent, or Firm* — Westerman, Hattori, Daniels & Adrian, LLP

(57) ABSTRACT

A fuel tank includes a tank body having an outer wall formed of a synthetic resin layer having a multilayer structure. The tank body has at least an inner body layer (an inner adhesive layer and an inner base layer) and an outer body layer (a skin layer, an outer base layer, and an outer adhesive layer) between which a barrier layer is interposed. A structure having an air layer therein is attached to the outer side of the skin layer of the outer body layer.

8 Claims, 5 Drawing Sheets

(56) References Cited

U.S. PATENT DOCUMENTS

2002/0047015 A1* 4/2002 Distelhoff ........ B60K 15/03177
220/562
2004/0071904 A1* 4/2004 Short ........................ B32B 1/02
428/35.7

* cited by examiner

AUTOMOTIVE FUEL TANK

CROSS REFERENCES TO RELATED APPLICATIONS

The present application claims priority under 35 U.S.C. §119 to Japanese Patent Application No. 2014-124094, filed Jun. 17, 2014, entitled "Automotive Fuel Tank." The contents of this application are incorporated herein by reference in their entirety.

TECHNICAL FIELD

The present disclosure relates to an automotive fuel tank.

BACKGROUND

For example, Japanese Patent No. 5333116 discloses a fuel tank including a tank body formed of resin material in a substantially box-like shape, upper and lower thermal insulators disposed so as to entirely surround the periphery of the tank body, base members fixed to fixing holes formed in the upper and lower thermal insulators, and anchor members connecting the upper and lower thermal insulators. In this case, the anchor members each have a pair of insertion pins. By inserting the pair of insertion pins into insertion holes of the base members, the upper and lower thermal insulators are connected.

In the fuel tank structure disclosed in Japanese Patent No. 5333116, attaching the divided upper and lower thermal insulators to the tank body requires a plurality of members, such as a plurality of base members fixed to the thermal insulators, and anchor members having insertion pins inserted into insertion holes of the base members.

For this reason, manufacturing the fuel tank disclosed in Japanese Patent No. 5333116 requires, for example, the step of inserting and fixing the base members into the fixing holes of the upper and lower thermal insulators, and the step of inserting the insertion pins of the anchor members into the insertion holes of the base members. This makes the manufacturing process cumbersome.

SUMMARY

The present application describes an automotive fuel tank that has improved thermal insulation properties while having a simple structure and that can be easily manufactured.

In an aspect of the present disclosure, an automotive fuel tank includes a tank body having an outer wall formed of a synthetic resin layer having a multilayer structure. The tank body has at least an inner body layer and an outer body layer between which a barrier layer is interposed. A structure having an air layer therein is attached to the outer side of a skin layer forming the outer body layer.

Accordingly, a structure having an air layer therein can be easily attached to the outer side of a skin layer (outer body layer) forming a tank body in the after-attachment process. Since a thermal insulating effect is obtained owing to the air layer provided in the structure, thermal insulation properties can be improved and the generation of evaporated fuel (vapor) can be suppressed by a simple structure. In addition, since the structure attached to the outer side of the skin layer exerts a reinforcing effect, the pressure resistance of the tank body can be improved. Thus, by attaching the structure to the outer side of the skin layer of the tank body, the fuel tank can be easily manufactured, and both a thermal insulating effect and a pressure resisting effect can be achieved.

The structure may be formed of the same material as the outer body layer, and may be welded to the outer surface of the outer body layer when molding the inner body layer and the outer body layer.

Accordingly, by forming the structure of the same resin as the outer body layer (for example, high density polyethylene (HDPE)), the structure can be easily welded to the skin layer forming the outer surface of the outer body layer when molding the inner body layer and the outer body layer, and the structure can be integrally attached to the tank body. As a result, unlike the conventional art, the step of inserting and fixing the base members into the fixing holes of the upper and lower thermal insulators, and the step of inserting the insertion pins of the anchor members into the insertion holes of the base members are not required, and the attaching of the structure to the skin layer can be easily performed compared to the conventional art.

The structure may be formed by foaming the same material as the outer body layer.

Accordingly, by forming the structure of foam material, the tank body and the structure can be easily integrally molded by continuous extrusion molding (for example, normal blow molding or twin sheet blow molding).

In the present disclosure, an automotive fuel tank that has improved thermal insulation properties while having a simple structure and that can be easily manufactured can be obtained.

BRIEF DESCRIPTION OF THE DRAWINGS

The advantages of the disclosure will become apparent in the following description taken in conjunction with the following drawings.

DETAILED DESCRIPTION

Figure 1:
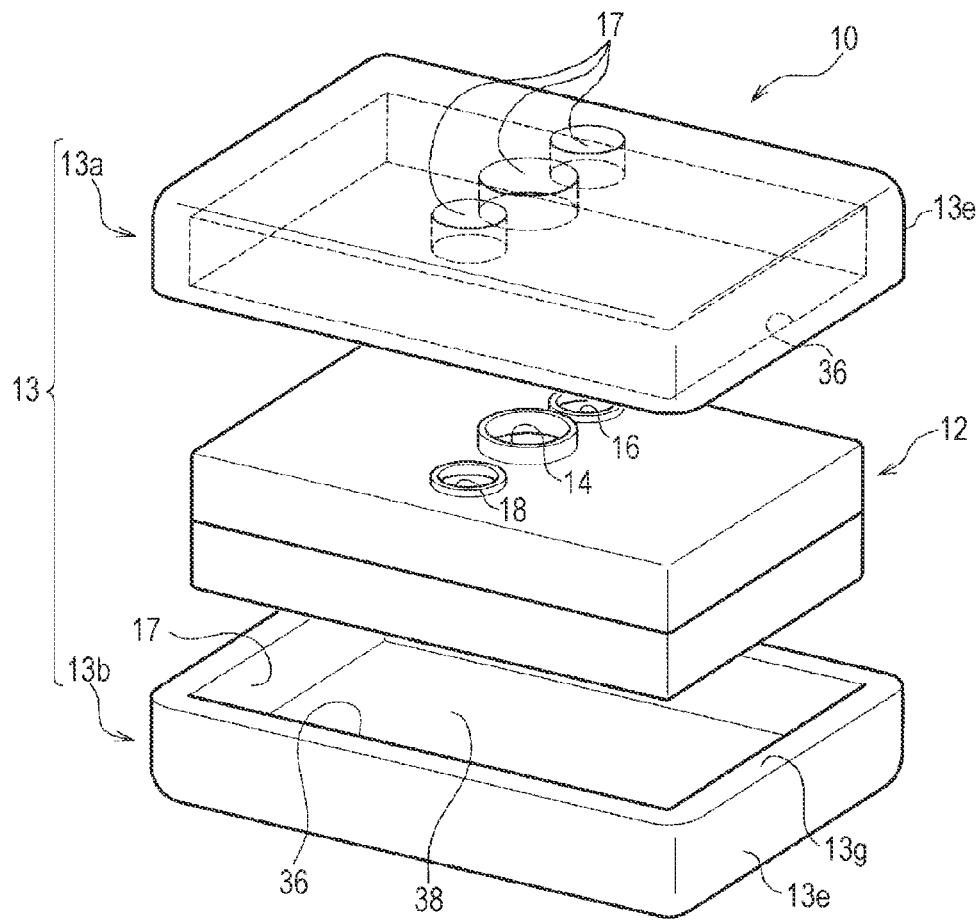
FIG. 1 is an exploded perspective view of a fuel tank according to an embodiment of the present disclosure.
Figure 2:
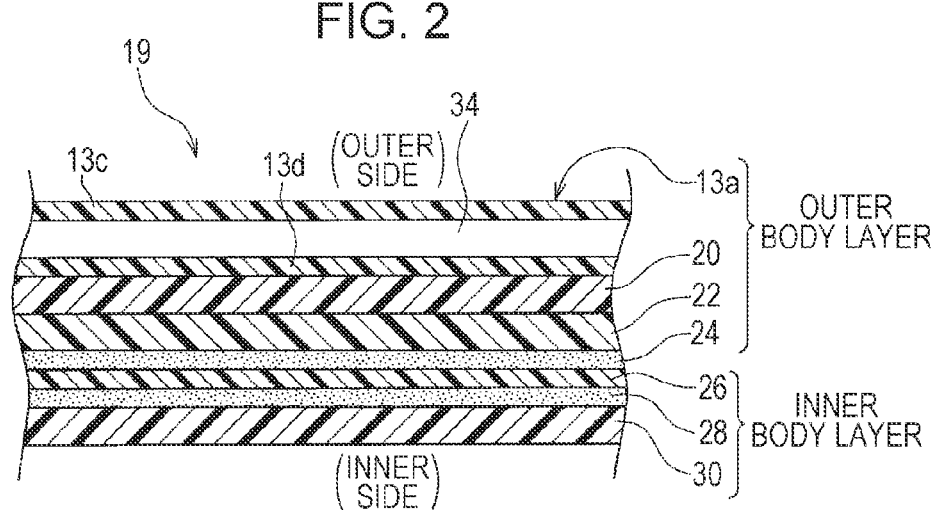
FIG. 2 is a partial enlarged sectional view showing the sectional structure of the outer wall of an upper structure and a tank body forming the fuel tank of FIG. 1.
Figure 3:
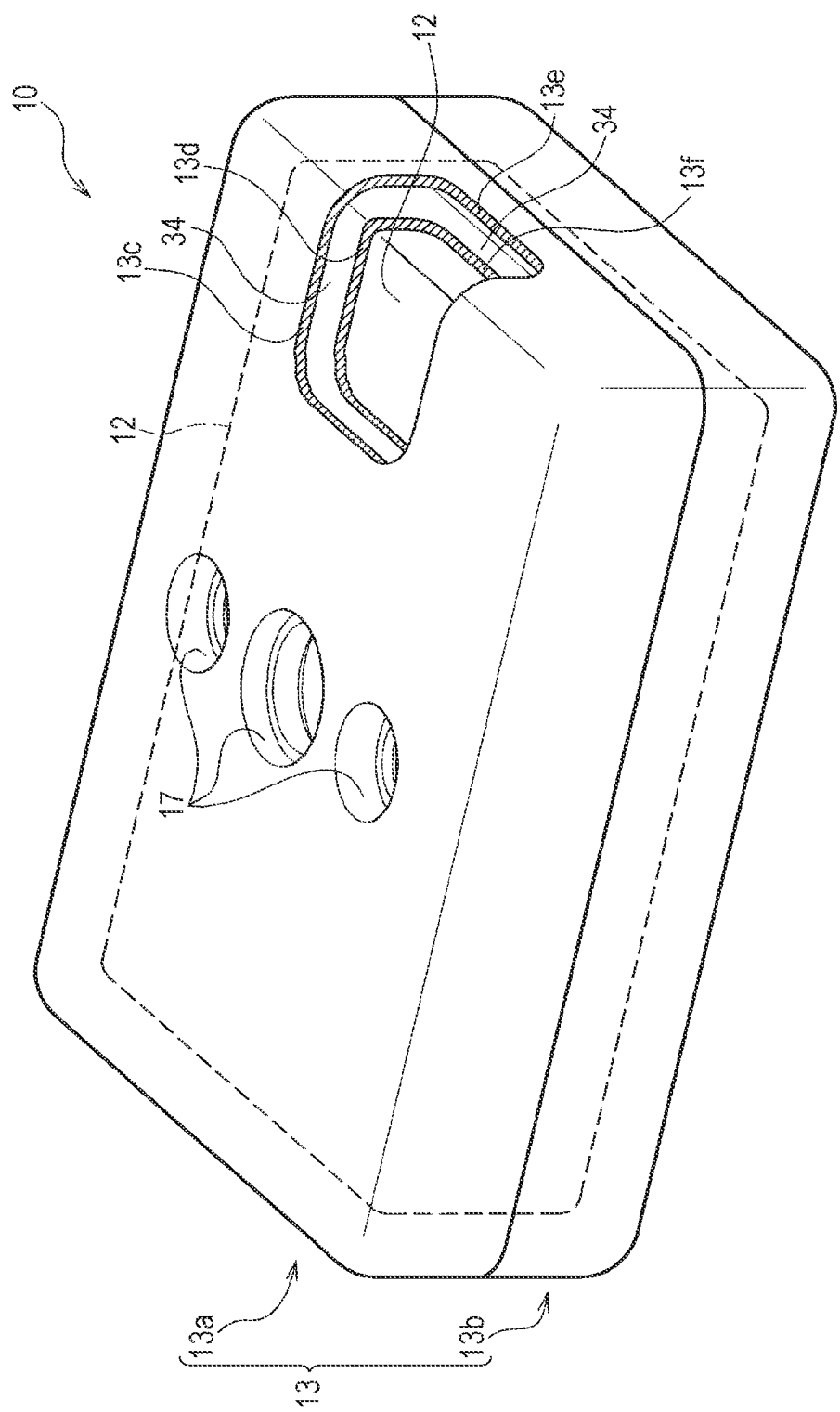
FIG. 3 is a partially cutout perspective view of the fuel tank.

An embodiment of the present disclosure will now be described in detail with reference to the drawings. FIG. 1 is an exploded perspective view of a fuel tank according to an embodiment of the present disclosure. FIG. 2 is a partial enlarged sectional view showing the sectional structure of the outer wall of an upper structure and a tank body forming the fuel tank of FIG. 1. FIG. 3 is a partially cutout perspective view of the fuel tank.

A fuel tank (automotive fuel tank) 10 is attached and fixed to an automotive body (not shown). As shown in FIG. 1, the fuel tank 10 includes a shell-like tank body 12 that can hold fuel oil such as gasoline therein, and a structure 13 that is disposed on the outer side of the tank body 12 and that surrounds the whole of the tank body 12. The structure 13 is divided into two parts: an upper structure 13*a* and a lower structure 13*b*. In the following description, the upper structure 13a and the lower structure 13b are sometimes not particularly distinguished from each other, and the two parts are sometimes collectively referred to as "structure 13."

A pump attachment hole 14 for attaching a pump or the like (not shown), an attachment hole 16 for connecting a hose or the like for recovering fuel vapor in the tank body 12, and an attachment hole 18 for connecting a return pipe (not shown) are provided in the upper surface of the tank body 12. A fuel inlet (not shown) through which fuel is injected from an inlet pipe (not shown) is provided in the side surface of the tank body 12. A plurality of openings 17 that correspond to and communicate with the pump attachment hole 14, the attachment holes 16 and 18, the fuel inlet, and the like of the tank body 12 are formed in the upper structure 13a.

Figure 4A:
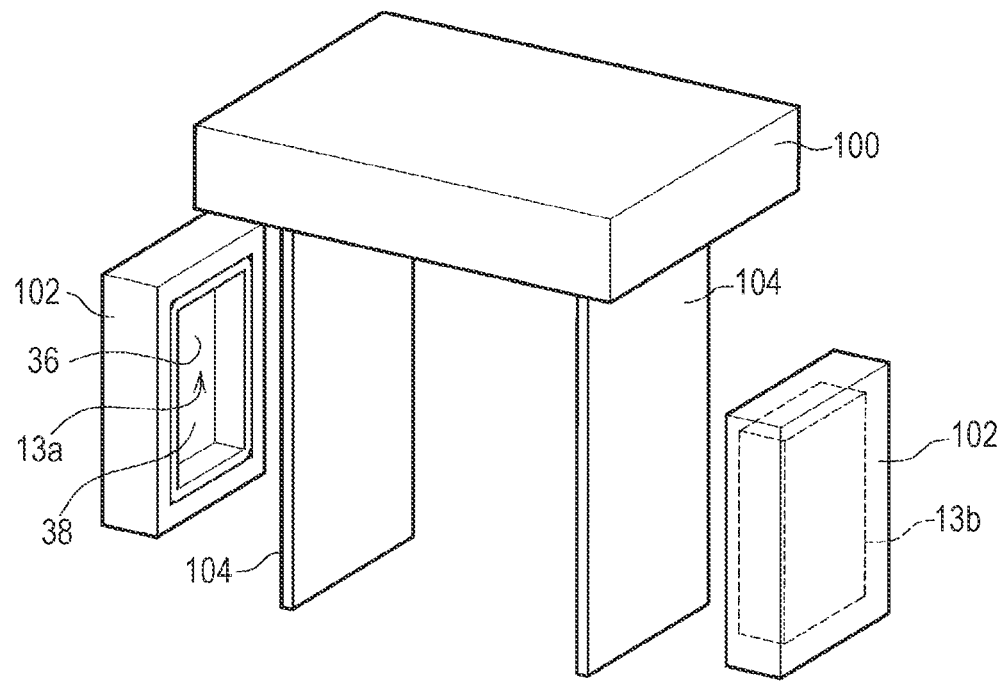
FIGS. 4A and 4B are explanatory diagrams showing the manufacturing process of molding a fuel tank by twin sheet blow molding.
Figure 4B:
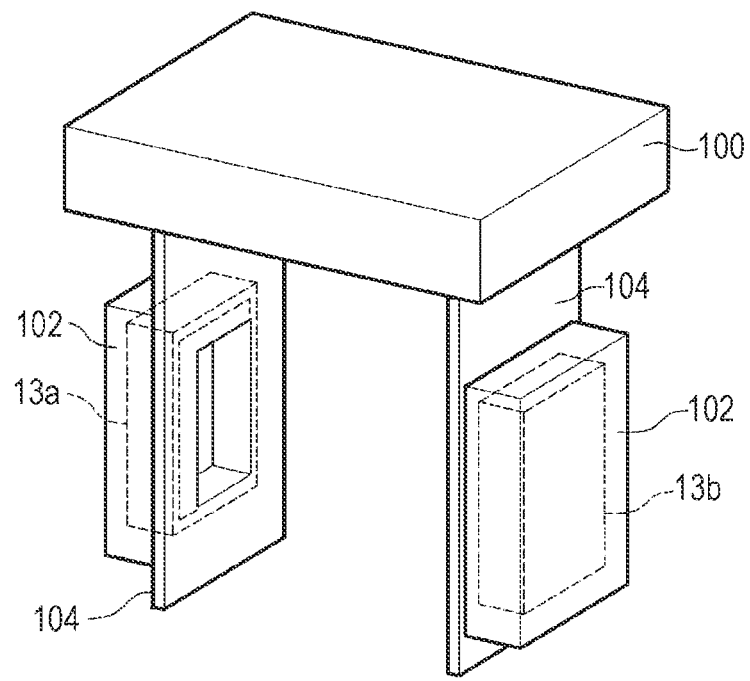

The fuel tank 10 is formed, for example, by blow molding, extrusion sheet molding, or the like. In this embodiment, as shown in FIGS. 4A and 4B and to be described later, the fuel tank 10 is formed by twin sheet blow molding.

As shown in FIG. 2, the outer wall 19 of the fuel tank 10 includes, in order from the outer side to the inner side, a structure 13a, a skin layer 20, an outer base layer 22, an outer adhesive layer 24, a barrier layer 26, an inner adhesive layer 28, and an inner base layer 30. An air layer 34 formed of a closed space is provided in each of the structures 13a and 13b.

Although, as shown in FIG. 1, in this embodiment, the upper structure 13a and the lower structure 13b have substantially the same shape, except the plurality of openings 17, they may have different shapes. For example, the upper structure 13a and the lower structure 13b may be formed of a box body having a rectangular opening and a lid body covering the opening.

The upper structure 13a and the lower structure 13b are each a sealed body having an air layer 34 therein. The upper structure 13a (lower structure 13b) includes an outer wall portion 13c and an inner wall portion 13d that are vertically opposed to each other with a predetermined spacing therebetween, an outer side wall 13e that continues from the outer wall portion 13c in a direction substantially perpendicular to the outer wall portion 13c, an inner side wall 13f that continues from the inner wall portion 13d in a direction substantially perpendicular to the inner wall portion 13d, and a connecting wall 13g that connects the edges of the outer side wall 13e and the inner side wall 13f.

The inner wall portion 13d and the inner side wall 13f form a recessed portion 36 that is recessed toward the outer wall portion 13c and that can house the upper or lower part of the tank body 12. A welding surface 38 that is welded to the skin layer 20 of the tank body 12 is formed on the inner bottom of the recessed portion 36. As shown in FIG. 3, the air layer 34 is formed of a space portion that is formed between the outer wall portion 13c and the inner wall portion 13d that are vertically spaced apart by predetermined distance, and a space portion that is surrounded by the outer side wall 13e, the inner side wall 13f, and the connecting wall 13g.

The structure 13 is disposed on the outermost side of an outer body layer forming the outer wall 19 (see FIG. 2), and is preferably formed of the same material as the outer base layer 22, for example, high density polyethylene (HDPE). As described later, the structure 13 is attached to the outer body layer by after-attachment when molding the inner body layer and the outer body layer.

The structure 13 is disposed so as to be out of contact with fuel oil such as gasoline held in the tank body 12. In the twin sheet blow molding shown in FIGS. 4A and 4B, a flat parison 104 formed of the above-described six layers excluding the structure 13 is used. The details of FIGS. 4A and 4B will be described later.

As shown in FIG. 2, the outer wall 19 of the tank body 12 is formed of a synthetic resin layer having the above-described multilayer structure, and includes an inner body layer (the inner adhesive layer 28 and the inner base layer 30) and an outer body layer (the skin layer 20, the outer base layer 22, and the outer adhesive layer 24) between which the barrier layer 26 is interposed. That is, the outer wall 19 of the tank body 12 has a multilayer sectional structure in which the barrier layer 26 formed of a material having a high fuel-impermeability is interposed between at least an inner thermoplastic resin layer forming the inner surface of the tank and an outer thermoplastic resin layer forming the outer surface of the tank.

The skin layer 20 and the outer base layer 22 are formed of thermoplastic synthetic resin that has high impact resistance and whose stiffness is maintained for fuel oil. Examples of thermoplastic synthetic resin include polyethylene resin, polyamide resin, and polyester resin. When the skin layer 20 is formed of polyethylene resin, the skin layer 20 is preferably formed of high density polyethylene (HDPE).

When the outer base layer 22 is formed of polyethylene resin, recycled resin (regrind material) can be used. For example, in the case of recycled resin that contains high density polyethylene (HDPE) as the main material, a fuel tank 10 recovered after use, a fuel tank determined as defective in the manufacturing process, or the like is ground and recycled.

The outer adhesive layer 24 is provided between the outer base layer 22 and the barrier layer 26 and bonds the outer base layer 22 and the barrier layer 26 together. Examples of adhesive synthetic resin used as the outer adhesive layer 24 include modified polyolefin resin, and more specifically, unsaturated carboxylic acid modified polyethylene resin is preferable.

In this embodiment, the outer body layer is formed of the skin layer 20, the outer base layer 22, and the outer adhesive layer 24. However, the present disclosure is not limited to this. For example, the outer base layer 22 and the outer adhesive layer 24 may be omitted, and the skin layer 20 and the barrier layer 26 may be directly welded together.

The barrier layer 26 is formed of thermoplastic synthetic resin having extremely low permeability to fuel oil, and is preferably formed, for example, of ethylene vinylalcohol copolymer (EVOH). By using ethylene vinylalcohol copolymer (EVOH) as the barrier layer 26, impermeability to gasoline can be improved.

The inner adhesive layer 28 is provided between the barrier layer 26 and the inner base layer 30 and bonds the barrier layer 26 and the inner base layer 30 together. As with the outer adhesive layer 24, examples of adhesive synthetic resin used as the inner adhesive layer 28 include modified polyolefin resin, and more specifically, unsaturated carboxylic acid modified polyethylene resin is preferable.

As with the skin layer 20, the inner base layer 30 is formed of thermoplastic synthetic resin. Examples of thermoplastic synthetic resin include polyethylene resin, polyamide resin, and polyester resin. When the inner base layer 30 is formed of polyethylene resin, the inner base layer 30 is preferably formed of high density polyethylene (HDPE).

In this embodiment, the inner body layer is formed of the inner adhesive layer 28 and the inner base layer 30. However, the present disclosure is not limited to this. For example, the inner adhesive layer 28 may be omitted, and the barrier layer 26 and the inner base layer 30 may be directly welded together.

The fuel tank 10 according to this embodiment is basically configured as above. Next, methods for manufacturing it will be described.

FIGS. 4A and 4B are explanatory diagrams showing the manufacturing process of molding a fuel tank by twin sheet blow molding. An upper structure 13a and a lower structure 13b each having an air layer 34 therein are manufactured and prepared separately from a tank body 12, and are preliminarily fitted in cavities of a pair of molds 102 with the welding surfaces 38 thereof facing inward.

As shown in FIG. 4A, two sheet-like flat parisons 104 are lowered substantially parallel to each other by a predetermined length from nozzles (not shown) of a forming die 100. Next, as shown in FIG. 4B, the pair of molds 102 are brought to an open and opposed state under the forming die 100, and then the flat parisons 104 are introduced into the molds 102.

The two flat parisons 104 are each formed of six layers, excluding the structure 13, laminated in the order, away from the molds 102, of a skin layer 20, an outer base layer 22, an outer adhesive layer 24, a barrier layer 26, an inner adhesive layer 28, and an inner base layer 30.

The molds are evacuated to conform the parisons 104 to the recessed portions 36 of the structures 13 preliminarily fitted in the cavities of the molds 102, and the welding surfaces 38 of the structures 13 and the skin layers 20 of the parisons 104 are welded together.

After that, the flat parisons 104 are cut in a predetermined length using a cutter (not shown). In a state where the molds 102 are clamped together, air is blown into the flat parisons 104 facing each other from an air nozzle (not shown) to press the outer surfaces of the flat parisons 104 against the structures 13 to mold a fuel tank 10. The molds 102 are opened, and the fuel tank 10 in which the outer side of the tank body 12 is surrounded by the structure 13 is taken out.

In this embodiment, the upper structure 13a and the lower structure 13b that are formed of the same material as the outer base layer 30 and that each have an air layer 34 therein can be easily attached to the skin layer 20 (outer body layer) of the tank body 12 in the after-attachment process. In this embodiment, since a thermal insulating effect is obtained owing to the air layers 34 provided in the upper structure 13a and the lower structure 13b, thermal insulation properties can be improved and the generation of evaporated fuel (vapor) can be suppressed by a simple structure. In addition, since the upper structure 13a and the lower structure 13b attached to the outer body layer surround the whole of the tank body 12 and exert a pressure resisting effect, the pressure resistance of the tank body 12 can be improved.

Thus, in this embodiment, the fuel tank 10 can be easily manufactured by attaching the structure 13 to the outer side of the tank body 12, and both a thermal insulating effect and a pressure resisting effect on the tank body 12 can be achieved owing to the structure 13 attached to the outer side of the skin layer 20.

In this embodiment, by forming the structure 13 of the same resin as the outer base layer 30 (outer body layer) (for example, high density polyethylene (HDPE)), the structure 13 can be easily welded to the skin layer 20 when molding the outer body layer and the inner body layer. As a result, the attaching of the structure 13 to the skin layer 20 can be easily performed.

FIGS. 5A to 5D are explanatory diagrams showing the manufacturing process of molding a fuel tank by normal blow molding. In the following description, the same reference signs will be used to designate the same components as those shown in FIGS. 1 to 3, and the detailed description thereof will be omitted. As with the manufacturing process shown in FIGS. 4A and 4B, structures 13 are separately manufactured, and are preliminarily fitted in cavities of a pair of molds 210 with the welding surfaces 38 thereof facing inward.

Plasticized resin is extruded as a cylindrical parison 204 from a nozzle 202 of a forming die 200 by an extrusion molding apparatus (not shown). The upper part of the extruded cylindrical parison 204 is gripped by a gripping portion 208 of a robot hand 206, and is cut with a cutter (not shown), and a parison 204 having a predetermined length in the vertical direction is thereby obtained (see FIG. 5A).

The pipe-like (tubular) parison 204 gripped by the gripping portion 208 of the robot hand 206 is formed of six layers, excluding the structure 13, laminated in the order, from the inner side to the outer side, of a skin layer 20, an outer base layer 22, an outer adhesive layer 24, a barrier layer 26, an inner adhesive layer 28, and an inner base layer 30.

Next, in a state where a pair of molds 210 are not closed, the upper end of the parison 204 is closed by the gripping portion 208 of the robot hand 206, and the lower end of the parison 204 is closed by pinch plates 212. In this state, air is preliminarily supplied into a space 214 closed by the parison 204 to expand (deform) the parison 204.

Figure 5A:
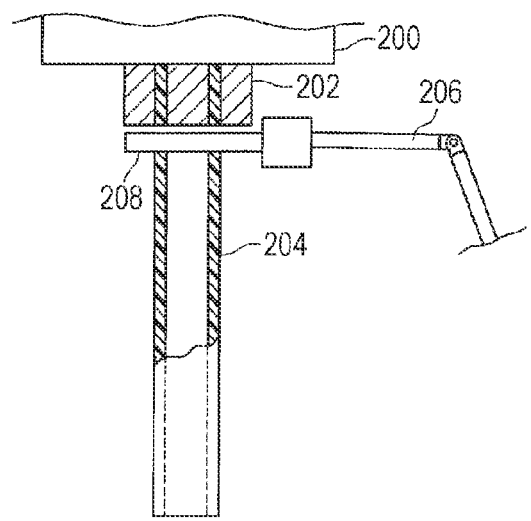
FIGS. 5A to 5D are explanatory diagrams showing the manufacturing process of molding a fuel tank by normal blow molding.
Figure 5B:
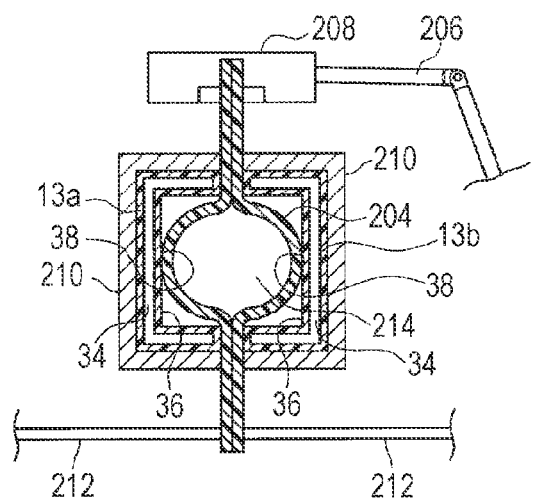

Next, the thus expanded parison 204 is held between the pair of molds 210 in which the structures 13 are preliminarily fitted (see FIG. 5B). Next, in a state where the upper and lower parts of the parison 204 are closed by the pair of molds 210, air is supplied into the space 214 of the parison 204 (see FIG. 5C). By this air, the parison 204 is further expanded and is pressed into the recessed portions 36 of the structures 13.

Figure 5C:
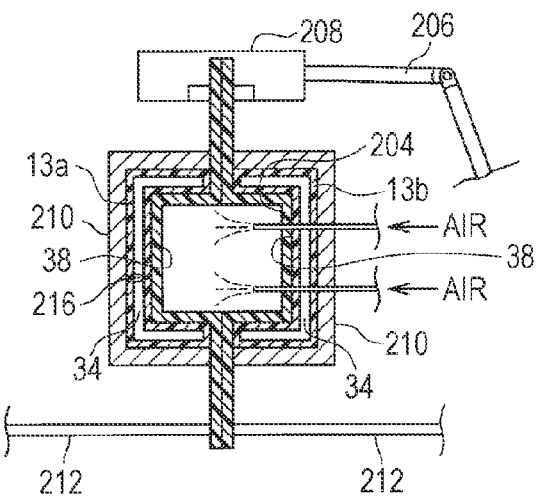
Figure 5D:
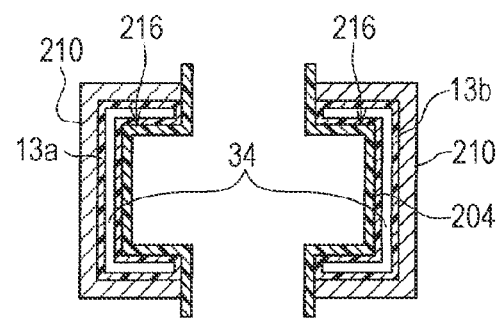

The parison 204 is pressed outward and expanded, the welding surfaces 38 of the structures 13 preliminarily fitted in the cavities of the molds 210 and the skin layer 20 that is the outer surface of the parison 204 are thereby welded together, and a hollow temporary molded article 216 is molded (see FIG. 5C). This temporary molded article 216 is vertically divided into two halves in the substantially central part thereof (along the parting line of the molds) with a cutter (not shown) (see FIG. 5D), and then built-in components (child components) (not shown) built in a tank body 12 are welded to the inner surface of the temporary molded article 216. By removing unnecessary parts and integrally coupling two temporary molded articles 216, a fuel tank 10 is manufactured.

Thus, even in a case where a fuel tank 10 is manufactured using a cylindrical resin parison 204 by normal blow molding shown in FIGS. 5A to 5D, structures 13 can be easily attached by after-attachment by welding the structures 13 to the skin layer 20 of the tank body 12.

In this embodiment, by forming the structures 13 of foam material (for example, high density polyethylene (HDPE)), the tank body 12 and the structures 13 can be easily integrally molded by continuous extrusion molding such as normal blow molding or twin sheet blow molding.

Figure 6:
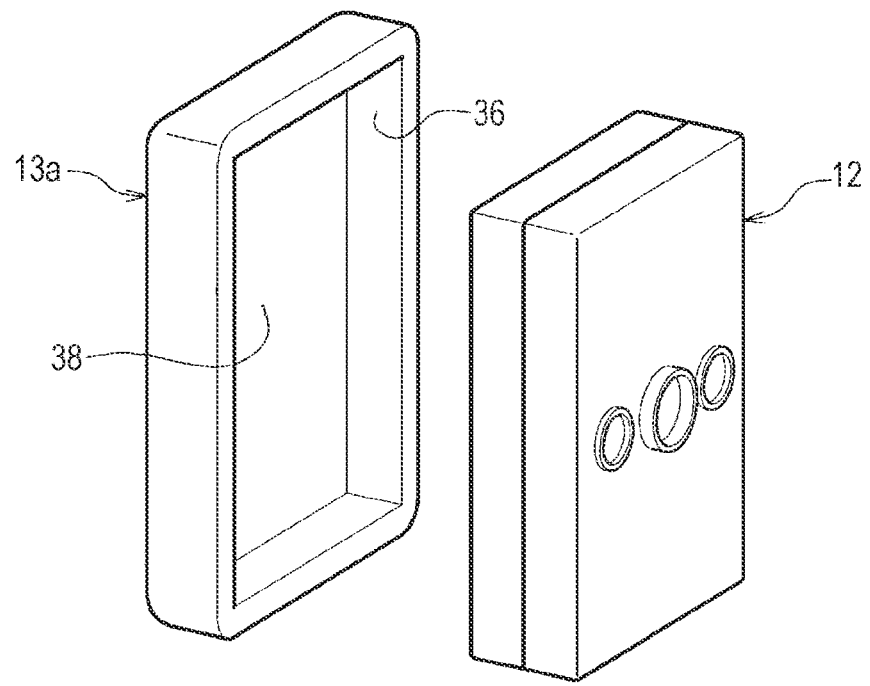
FIG. 6 is an explanatory diagram showing a state where a structure is attached to an existing tank body.

FIG. 6 is an explanatory diagram showing a state where a structure is attached to an existing tank body. As shown in FIG. 6, an upper structure 13a and a lower structure 13b (not shown) capable of housing the whole of a conventionally manufactured tank body 12 may be separately manufactured, and welding surfaces 38 formed in recessed portions 36 of the upper structure 13a and the lower structure 13b and the outer surface of the tank body 12 may be welded together. Alternatively, the structures 13 may be fixed to the outer surface of the tank body 12 using clips (not shown). Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. An automotive fuel tank comprising:
   a tank body having an outer wall formed of a synthetic resin layer having a multilayer structure,
   wherein the tank body has at least an inner body layer, an outer body layer and a barrier layer interposed between the inner body layer and the outer body layer; and
   a cover structure having an air layer therein, the cover structure being attached to the outer side of a skin layer of the outer body layer,
   wherein the cover structure includes an inner wall and an outer wall, wherein the air layer is disposed between the inner wall and the outer wall,
   wherein the inner wall is welded to the skin layer of the outer body layer.

2. The automotive fuel tank according to claim 1, wherein the cover structure is formed of the same material as the outer body layer, and is welded to the outer surface of the outer body layer when molding the inner body layer and the outer body layer.

3. The automotive fuel tank according to claim 1, wherein the cover structure is formed by foaming the same material as the outer body layer.

4. The automotive fuel tank according to claim 1, wherein the barrier layer is impermeable to a fuel.

5. The automotive fuel tank according to claim 1, wherein the inner wall includes an inner surface, the skin layer includes an outer surface facing the inner surface of the inner wall, and wherein the inner surface and the outer surface are welded together.

6. The automotive fuel tank according to claim 5, wherein the inner wall is made of the same material as the skin layer.

7. The automotive fuel tank according to claim 6, wherein the inner wall and the skin layer are made of high density polyethylene.

8. A vehicle comprising the automotive fuel tank according to claim 1.

* * * * *